United States Patent [19]

Steiner

[11] 4,030,393
[45] June 21, 1977

[54] APPARATUS FOR CUTTING CONVEYED MATERIALS

[75] Inventor: Anton Steiner, Baden, Austria

[73] Assignee: Semperit Aktiengesellschaft, Vienna, Austria

[22] Filed: June 16, 1976

[21] Appl. No.: 696,732

Related U.S. Application Data

[63] Continuation of Ser. No. 524,956, Nov. 18, 1974, abandoned.

[52] U.S. Cl. .................................. 83/318; 83/329; 83/490
[51] Int. Cl.² ........................................ B23D 45/20
[58] Field of Search ............ 83/318, 319, 320, 329, 83/330, 490

[56] References Cited

UNITED STATES PATENTS

| 1,622,378 | 3/1927 | Graupner | 83/318 |
| 3,089,372 | 5/1963 | Pilliner | 83/330 X |
| 3,354,765 | 11/1967 | Frey et al. | 83/318 X |

Primary Examiner—J. M. Meister
Attorney, Agent, or Firm—Werner W. Kleeman

[57] ABSTRACT

An apparatus for cutting conveyed materials, preferably webs or strand-shaped articles formed of reinforced or non-reinforced rubber by means of a rotating, oscillating or stationary knife or cutter, wherein the apparatus comprises a cutter car or carriage and a drive motor with a crank. The cutter is mounted upon a balance or rocker constructed as a lever. The balance is actuatable by means of the crank and the cutter describes a closed kinematic path of travel.

4 Claims, 2 Drawing Figures

APPARATUS FOR CUTTING CONVEYED MATERIALS

CROSS-REFERENCE TO RELATED CASE

This is a continuation of my commonly assigned copending U.S. patent application Ser. No. 524,956, filed Nov. 18, 1974, now abandoned, and entitled "Apparatus For Cutting Conveyed Materials".

BACKGROUND OF THE INVENTION

The present invention relates to an apparatus for cutting conveyed materials, preferably webs or strand-shaped articles, formed of reinforced or non-reinforced rubber with a rotating, oscillating or stationary knife or cutter.

With heretofore known systems to achieve this objective there was displaced in any event a cutter car or carriage, carrying a cutter, from a starting position into a predetermined terminal position, whereby the strip to be cut was cut. In the terminal position the knife was raised or upwardly tilted or folded and the cutter car or carriage again moved into its starting position where the cutter was again lowered. These systems are associated with technological and economical drawbacks since they are quite prone to disturbances and relatively slow in operation.

SUMMARY OF THE INVENTION

It is a primary object of the invention, while avoiding the aforementioned drawbacks, to provide an apparatus which is of predominant economic significance and to an extent which was not obtainable by the previous systems owing to their technological expenditure.

To implement this objective and to solve this problem there is proposed an apparatus which is manifested by the features that it comprises a cutter carriage or car and a drive motor with a crank, wherein the knife or cutter is mounted upon a balance or rocker constructed as a lever, the rocker being actuated by the crank, and the knife describing an endless or closed kinematic path of travel. This inventive apparatus has the notable advantage of a simpler control since only a single drive (electric motor) is present. Further this apparatus only has rotating parts which can be easily lubricated and encapsulated. This is of that much greater significance since many parts of the apparatus are subjected to a continually prevailing spray mist. Further no shock absorbing is required in the terminal positions, which with the conventional apparatuses always leads to disturbances of the entire system. The cutter or knife, with this inventive apparatus, in the terminal positions is circularly deflected so that it is considerably less prone to disturbances. Furthermore, by using the rotating drive there can be avoided the use of cylinders which always become untight or leak leading to disturbances and failures. Additionally there is possible a considerable increase in the cutting rate without increasing the cutting speed due to this special feature of the invention, since the cutter car or carriage in the terminal positions is not stationary and the cutter need not be raised nor lowered respectively, this being so because it is possible to carry out the operation in a single pass.

According to a further construction of the invention wherein the movement of the cutter occurs in one plane, even upon failure of the control there is no rupture of the cutter or knife. With the conventional apparatuses rupture would arise when the revolving knife is not raised or lowered in its terminal positions rather beforehand.

Moreover, it is advantageous if the knife during the cutting operation (forward movement) describes an approximately linear path of travel, during the return movement however an elliptical-shaped path of travel. Thus with minimum change in speed there is insured for an essentially straight cutting course or line.

An optimum cutting output is achieved when the knife is a rotating circular knife.

BRIEF DESCRIPTION OF THE DRAWING

The invention will be better understood and objects other than those set forth above, will become apparent when consideration is given to the following detailed description thereof. Such description makes reference to the annexed drawing wherein.

DETAILED DESCRIPTION OF THE PREFERRED EMBODIMENTS

Figure 1:
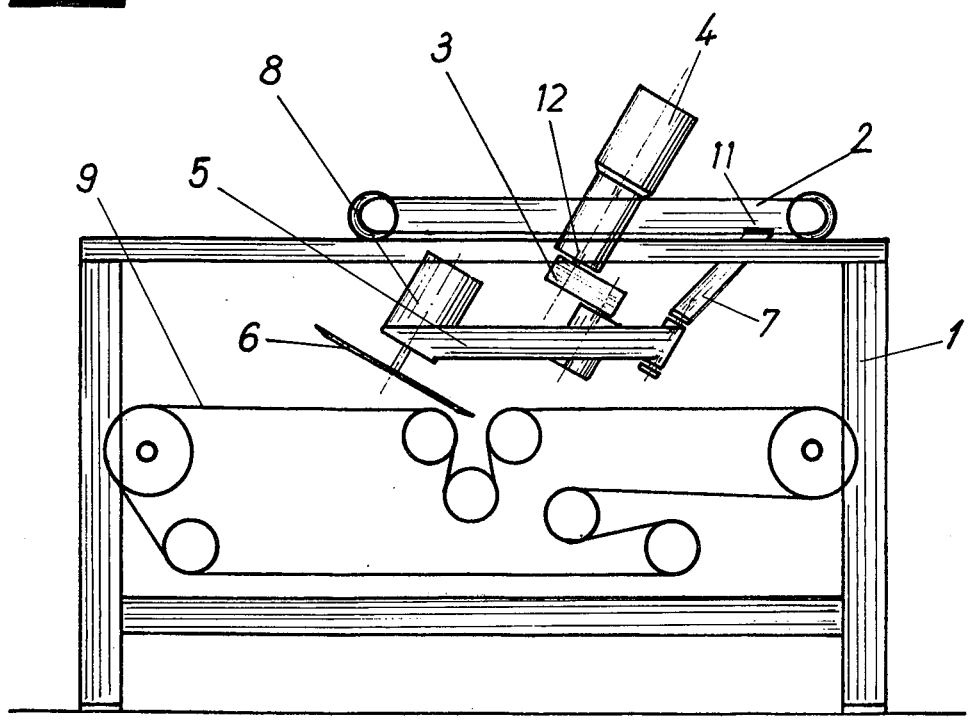
FIG. 1 schematically illustrates a preferred embodiment of the invention in front view.

Describing now the drawing the apparatus of FIG. 1 comprises a frame 1 upon which there is movably mounted a cutter carriage or car 2 in the transport direction of a conveyor band 9 or the like. On this cutter carriage 2 there is located a mounting or support 12 of a crank 3 driven by a motor 4. The crank 3 is hingedly connected with a balance or rocker 5 which again itself carries a circular knife 6 and hingedly connected with a guide 7. The circular knife or cutter 6 is driven by a motor 8. Further in FIG. 1 there is visible the conveyor band or belt 9 which at the engagement region of the circular knife possesses a downwardly directed deflected portion, as best seen by referring to the central region of such confeyor belt at the top run thereof.

Figure 2:
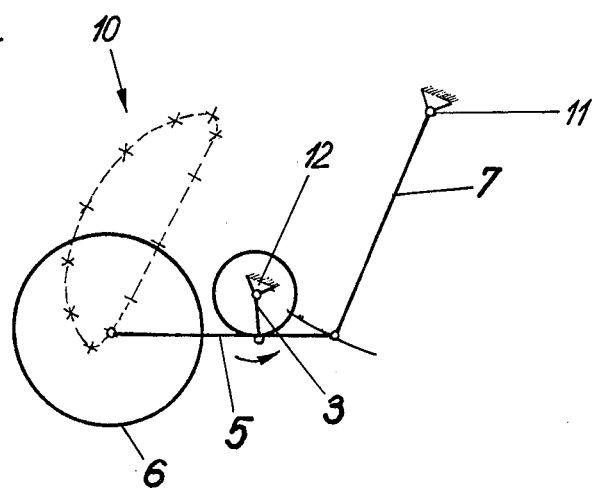
FIG. 2 illustrates the lever system and the course of movement of the circular knife of the inventive apparatus.

In FIG. 2 there is shown the lever system and the path of travel in which the rotating circular knife moves. The curve of the circular knife 6 constitutes a kinematic curve 10, and this curve consists of an approximately straight line and approximately one-half of an ellipse. Further there are visible as in FIG. 1 the already discussed lever, wherein the guide 7 is fixed at a point 11 of the cutter carriage 2 as well as the crank 3 being fixed at a point 12 of the cutter carriage 2.

It will be apparent to those skilled in the art by referring to FIG. 2, that as the crank 3 is rotated about its support axis 12, the end of the crank connected to balance 5 will describe the illustrated circular locus. This motion will cause the end of guide 7 connected to balance 5 to oscillate along a substantially spatially fixed arcuate locus. The end of balance 5 attached to cutter 6 will thus carry out the closed straight-line and semi-elliptical path movement shown in dashed lines in FIG. 2.

The cutting of for instance tread strips occurs essentially such that the rotating circular knife 6 moves along a closed curve. It is arranged upon a lever 5 of a predetermined kinematic lever system consisting of a crank 3 and a guide 7 and the balance 5 and wherein via the motor 4 the crank 3 is driven. Now if a tire tread stip (not particularly shown in the drawings) is continuously moved on the conveyor band 9, then the cutter carriage 2 moves with the same speed. At the same moment when the cutter carriage 2 has reached the speed of the conveyor band 9 then the rotating circular knife 6 comes into play, whereby the cutting operation takes place along an approximately straight line (kinematic linear guide). This operation is designated as the forward movement. In the return movement the rotating circular knife 6 is moved along an elliptical-shaped curve and as a result the knife or cutter is raised sufficiently above the surface of the tread strip. This raising of the cutter 6 is made possible by the inclination of the support axis 12 of the crank 3 which causes the balance 5 to move in a plane parallel to the lengthwise axis of crank 3. Since the plane of the cutter 6 is also arranged parallel to the lengthwise axis of the crank, its movement will be carried out in a single plane. Simultaneous with the return of the circular knife 6 there also occurs the return of the cutter carriage 2 after the cutting operation itself has been terminated. If the cutter carriage 2 has again returned back into its terminal position then this operation begins anew. Throughout the cycle time (time for the cutting operation and for the return of the circular knife and the carriage) there can be adjusted any desired length of a tread strip.

While there are shown and described present preferred embodiments of the invention, it is to be distinctly understood that the invention is not limited thereto, but may be otherwise variously embodied and practiced within the scope of the following claims. Accordingly,

What is claimed:

1. An apparatus for cutting conveyed materials, preferably webs or strand-shaped articles formed of reinforced or non-reinforced rubber by means of a cutter, comprising a cutter carriage movable in the transport direction of the conveyed materials, a drive motor secured to said cutter carriage, a crank driven by said motor, a balance constructed as a lever means, said cutter being mounted at said balance, said crank being operatively connected to said balance, and a guide pivotably connected to said carriage and pivotably connected to said balance, said cutter describing a closed kinematic path of travel when said crank is driven by said motor.

2. The apparatus as defined in claim 1, wherein the movement of the cutter occurs in one plane.

3. The apparatus as defined in claim 2, wherein the cutter operatively cooperates with the balance in a manner such that the cutter during the cutting operation while carrying out its forward movement describes an approximately straight line and during its return movement an approximately elliptical-shaped curve.

4. The apparatus as defined in claim 3, wherein the cutter is a rotating circular cutter.

* * * * *